United States Patent
Pan

(10) Patent No.: US 7,564,967 B2
(45) Date of Patent: Jul. 21, 2009

(54) ELECTRONIC DEVICE WITH TWO-DIMENSIONAL SLIDING COVER AND TWO-DIMENSIONAL SLIDE APPARATUS

(75) Inventor: Long-Jyh Pan, Taipei County (TW)

(73) Assignee: Qisda Corporation, Taoyuan County (TW)

( * ) Notice: Subject to any disclaimer, the term of this patent is extended or adjusted under 35 U.S.C. 154(b) by 691 days.

(21) Appl. No.: 11/372,270

(22) Filed: Mar. 10, 2006

(65) Prior Publication Data

US 2006/0226150 A1 Oct. 12, 2006

(30) Foreign Application Priority Data

Mar. 14, 2005 (TW) .............................. 94107668 A

(51) Int. Cl.
*H04M 9/00* (2006.01)
*H04M 1/00* (2006.01)

(52) U.S. Cl. ............................ 379/433.12; 379/433.11; 455/575.4; 455/556.2

(58) Field of Classification Search ............ 379/433.01, 379/433.11, 433.12; 455/550.1, 90.2, 556.1, 455/556.2, 575.4; 345/168, 169; 361/679, 361/680, 686
See application file for complete search history.

(56) References Cited

U.S. PATENT DOCUMENTS

| 6,934,518 | B2* | 8/2005 | Cheng | ........................ 455/90.3 |
| 7,076,058 | B2* | 7/2006 | Ikeuchi et al. | ........... 379/433.12 |
| 2006/0205451 | A1* | 9/2006 | Pan | ........................... 455/575.4 |
| 2006/0226150 | A1* | 10/2006 | Pan | ........................... 220/345.1 |
| 2007/0049356 | A1* | 3/2007 | Jung et al. | ............... 455/575.1 |

FOREIGN PATENT DOCUMENTS

TW M244672 9/2004

* cited by examiner

*Primary Examiner*—Curtis Kuntz
*Assistant Examiner*—Phylesha Dabney

(57) ABSTRACT

An electronic device with two-dimensional sliding cover and a two-dimensional slide apparatus are disclosed. The two-dimensional slide apparatus includes a first member, a second member, a third member and a first torque-retaining assembly. The second member is movable along a first direction in relation to the first member. The third member is movable between a first position and a second position along a second direction in relation to the second member, with a first central position therebetween. The first torque-retaining assembly is disposed between the second member and the third member. When the third member moves from the first position or the second position to the first central position by an external force, the first torque-retaining assembly generates torque, driving the third member from the first central position to the first position or the second position.

15 Claims, 15 Drawing Sheets

ELECTRONIC DEVICE WITH TWO-DIMENSIONAL SLIDING COVER AND TWO-DIMENSIONAL SLIDE APPARATUS

BACKGROUND OF THE INVENTION

1. Field of the Invention

The invention relates to an electronic device with two-dimensional sliding cover and a two-dimensional slide apparatus.

2. Brief Discussion of the Related Art

In recent years, portable electronic devices, such as digital cameras, cellular phones, and electronic dictionaries have become widely popular.

Frequently, portable electronic devices have an integral cover structure, often in configuration, hinged or sliding. An example of an electronic device, here a sliding cover cellular phone, is shown in FIG. 1A and FIG. 1B. The sliding cover cellular phone in FIG. 1A and FIG. 1B has a body 510 and a sliding cover 520. When the cellular phone is not in use, the sliding cover 520 assumes a closed position as shown in FIG. 1A to cover and protect at least part of the body 510. To use the cellular phone, the sliding cover 520 slides to an open position as shown in FIG. 1B to expose the body 510. When not in use, the sliding cover 520 returns to the closed position as shown in FIG. 1A.

In the above-mentioned electronic device, however, the sliding cover is manually operated, with external force required to move the sliding cover to the open or closed position. Thus, the electronic device is not convenient.

Further, the conventional electronic device with sliding cover generally provides a single function. For example, a cellular phone having a sliding cover serves only as a cellular phone, and the function provided is limited.

SUMMARY OF THE INVENTION

Accordingly, an exemplary embodiment of an electronic device with a two-dimensional sliding cover is provided. The electronic device comprises a first member, a second member and a third member. The first member comprises a first input module. The second member is movable along a first direction in relation to the first member, and comprises a second input module. The third member is movable along a second direction in relation to the second member, and comprises an output module.

The first direction may be perpendicular to the second direction. The first member may be a body.

The third member may be movable between a first position and a second position along the second direction in relation to the second member, with a first central position therebetween.

The two-dimensional sliding cover electronic device may further comprise a first torque-retaining assembly disposed between the second member and the third member. When the third member moves from the first position to the first central position in relation to the second member by a first external force, the first torque-retaining assembly generates a first torque, driving the third member from the first central position to the first position. When the third member moves from the second position to the first central position in relation to the second member by a second external force, the first torque-retaining assembly generates a second torque, driving the third member from the first central position to the second position.

The first torque-retaining assembly may comprise a first slide module and a second slide module, both disposed on the second member. The first slide module comprises a first rotating structure and a first elastic element, and the second slide module comprises a second rotating structure and a second elastic element. The first rotating structure is rotatable when the third member is between the first position and the first central position and not rotatable when the third member is between the first central position and the second position. The first elastic element comprises a first end fixed to the first rotating structure and a second end fixed to the second member. The second rotating structure is not rotatable when the third member is between the first position and the first central position and is rotatable when the third member is between the first central position and the second position. The second elastic element comprises a third end fixed to the second rotating structure and a fourth end fixed to the second member. When the third member moves from the first position to the first central position in relation to the second member by the first external force, the first rotating structure rotates to generate the first torque in the first elastic element, and the first torque drives the third member from the first central position to the first position. When the third member moves from the second position to the first central position in relation to the second member by the second external force, the second rotating structure rotates to generate the second torque in the second elastic element, and the second torque drives the third member from the first central position to the second position.

In some embodiments, the first torque-retaining assembly may comprise a first slide module, a first sliding track, a second slide module and a second sliding track. The first and second slide modules are disposed on the second member, and the first and second sliding tracks are disposed on the third member. Each of the first and second slide modules comprises a first and second supporting structure, a first and second gear and a first and second elastic element. Each of the first and second supporting structures comprises a first and second sliding notch, a first and second limiting portion and a first and second guide groove. Each of the first and second gears is disposed in the supporting structure and movable between a limited position and a free position along the guide groove. The first gear is not rotatable when limited by the first limiting portion and in the first limited position and rotatable when the first gear is in the first free position. The second gear is not rotatable when limited by the second limiting portion and in the second limited position and rotatable when the second gear is in the second free position. The first elastic element comprises a first end fixed to the first gear and a second end fixed to the first supporting structure. The second elastic element comprises a third end fixed to the second gear and a fourth end fixed to the second supporting structure. The first sliding track corresponds to the first sliding notch and comprises a first track section and a second track section, and the first track section comprises a first rack. The second sliding track corresponds to the second sliding notch and comprises a third track section and a fourth track section, and the fourth track section comprises a second rack. When the third member is between the first position and the first central position in relation to the second member, the first gear corresponds to the first track section and engages with the first rack, moving the first gear to the first free position, and the second gear corresponds to the third track section and is in the second limited position. When the third member is between the first central position and the second position in relation to the second member, the first gear corresponds to the second track section and is in the first limited position, and the second gear corresponds to the fourth track section and engages with the second rack, moving the second gear to the second free position.

Some embodiments disclose a two-dimensional slide assembly. The two-dimensional slide assembly comprises a first member, a second member, a third member and a first torque-retaining assembly. The second member is movable along a first direction in relation to the first member. The third member is movable between a first position and a second position along a second direction in relation to the second member, with a first central position therebetween. The first torque-retaining assembly is disposed between the second member and the third member. When the third member moves from the first position or the second position to the first central position by an external force, the first torque-retaining assembly generates torque, driving the third member from the first central position to the first position or the second position.

The first member may comprise a first input module, the second member may comprise a second input module, and the third member may comprise an output module.

The second member may be movable between a third position and a fourth position along the first direction in relation to the first member, with a second central position therebetween.

The first member may comprise a notch substantially extended along the first direction, the second member may comprise a block corresponding to the notch, and the second member is movable in relation to the first member along the first direction by the block and the notch. Further, the block may comprise a protrusion and the notch may comprise an indentation corresponding to the protrusion, and the first member and the second member are positioned when the protrusion is engaged in the indentation.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention can be more fully understood by reading the subsequent detailed description on conjunction with the examples and references made to the accompanying drawings, wherein.

DETAILED DESCRIPTION OF THE PREFERRED EMBODIMENTS

Figure 1A:
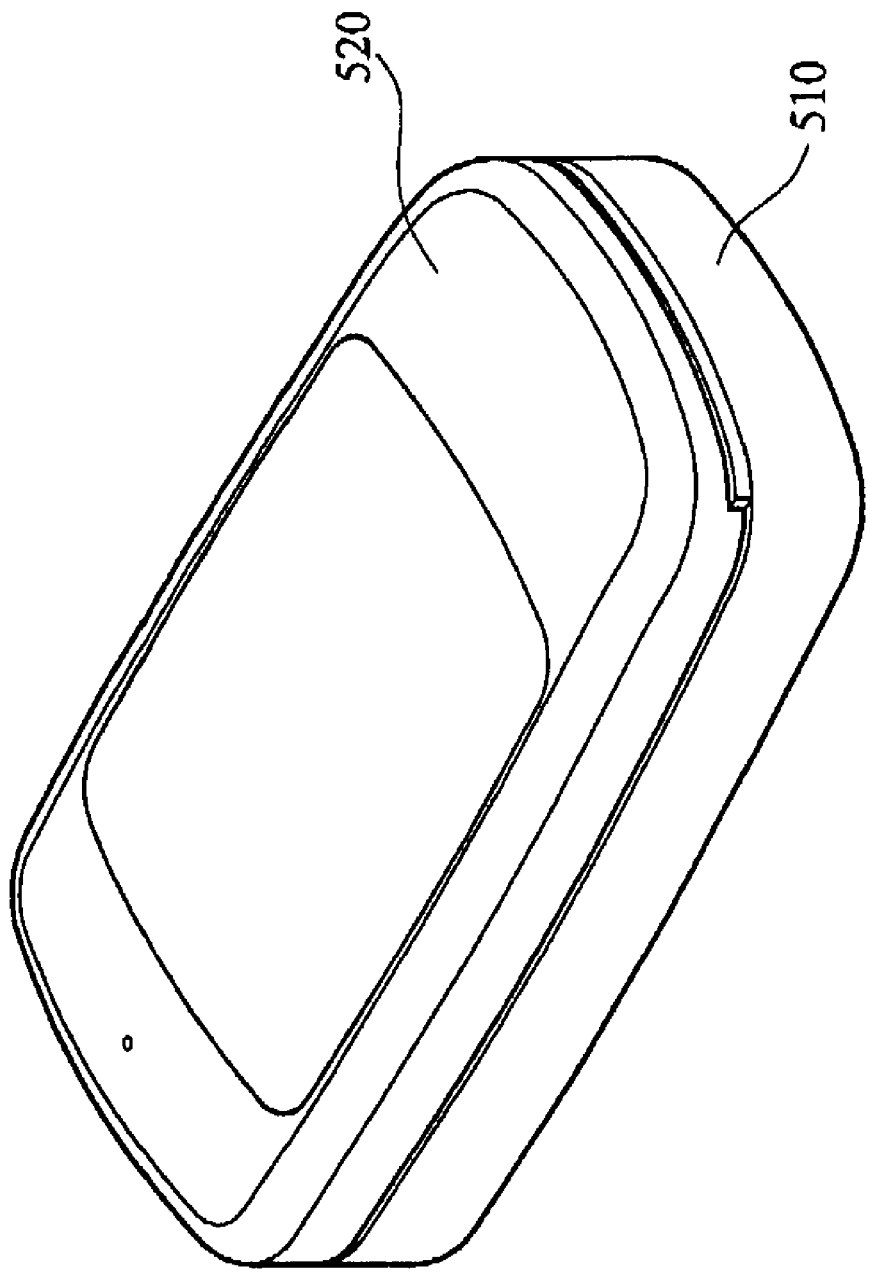
FIG. 1A is a schematic view of a conventional sliding cover electronic device with the sliding cover closed.
Figure 1B:
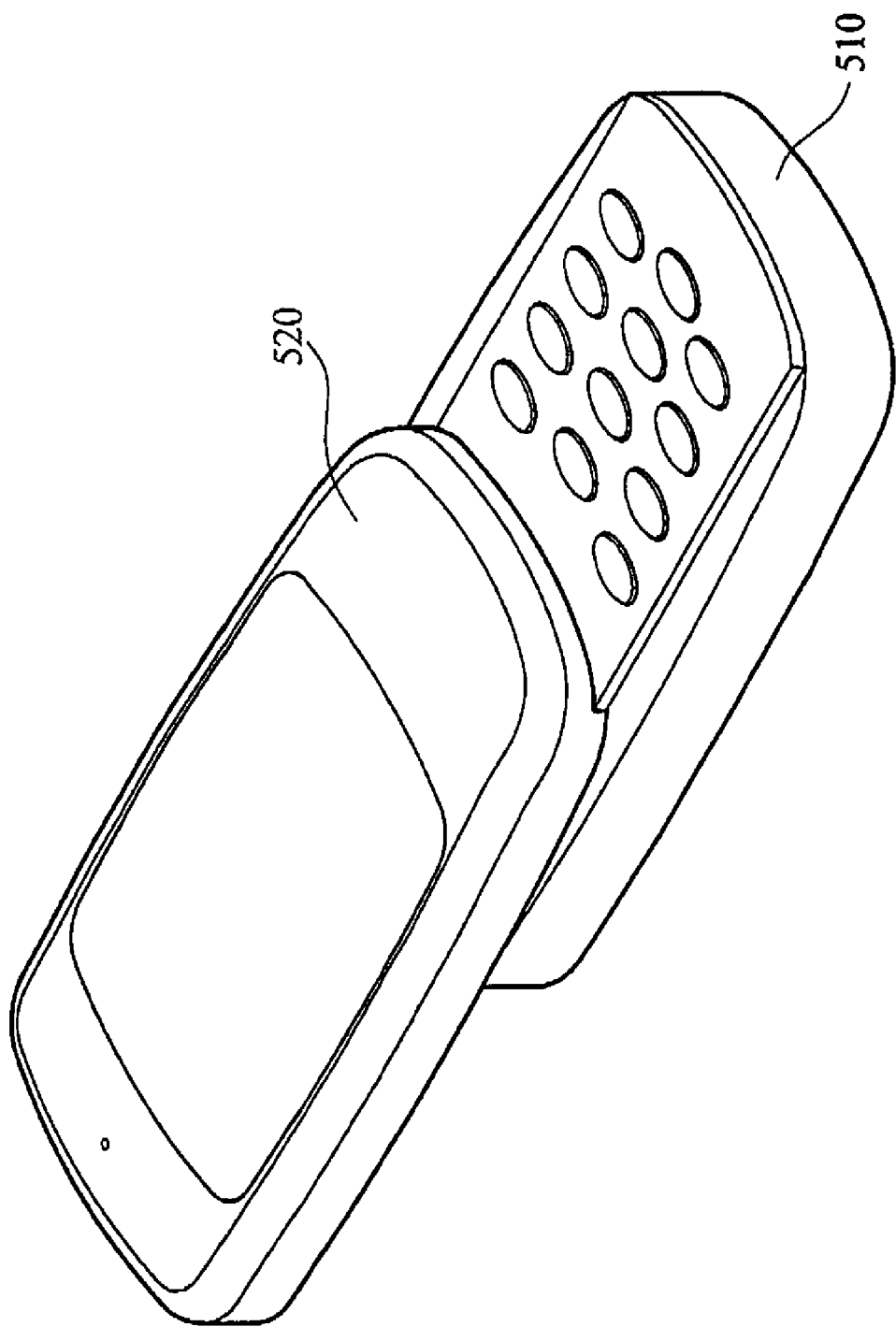
FIG. 1B is a schematic view of a conventional sliding cover electronic device with the sliding cover open.
Figure 2A:
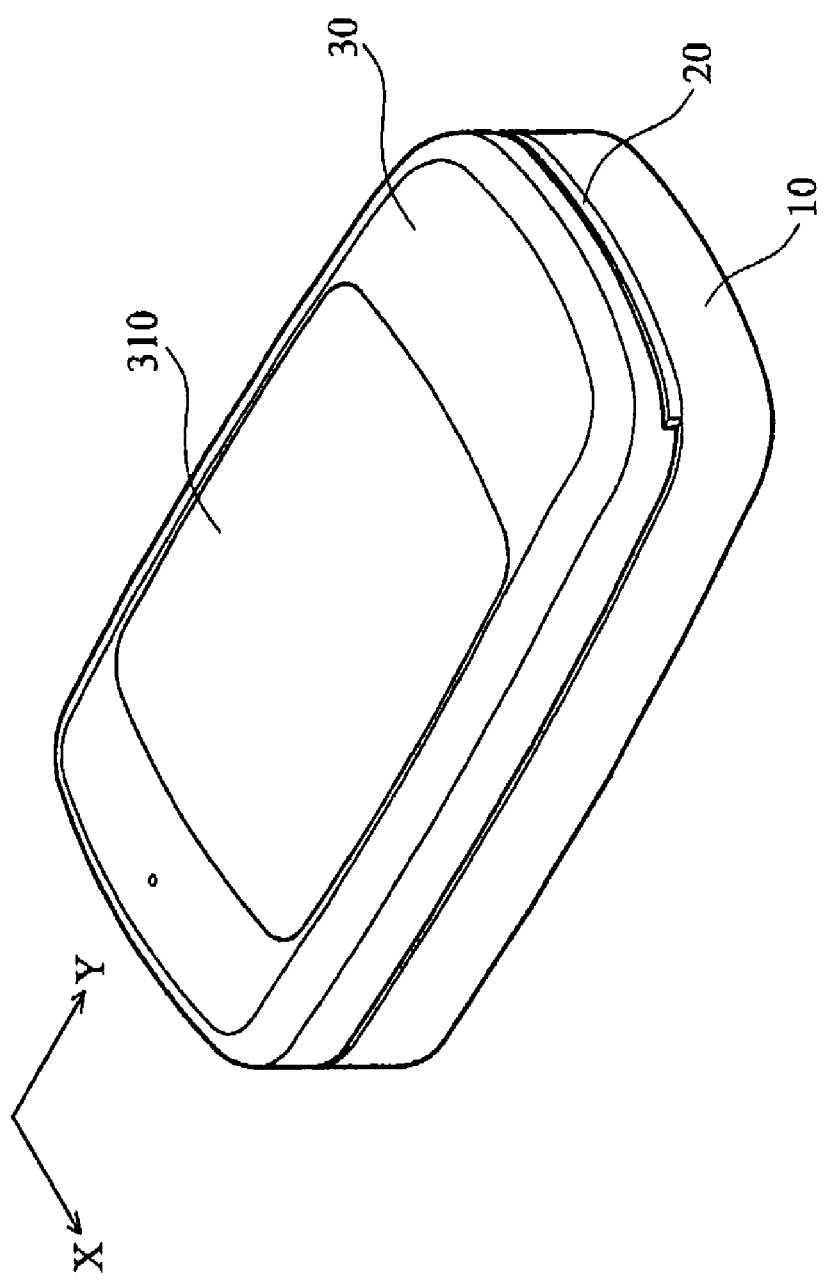
FIG. 2A is a schematic view of an embodiment of a two-dimensional slide assembly.
Figure 2B:
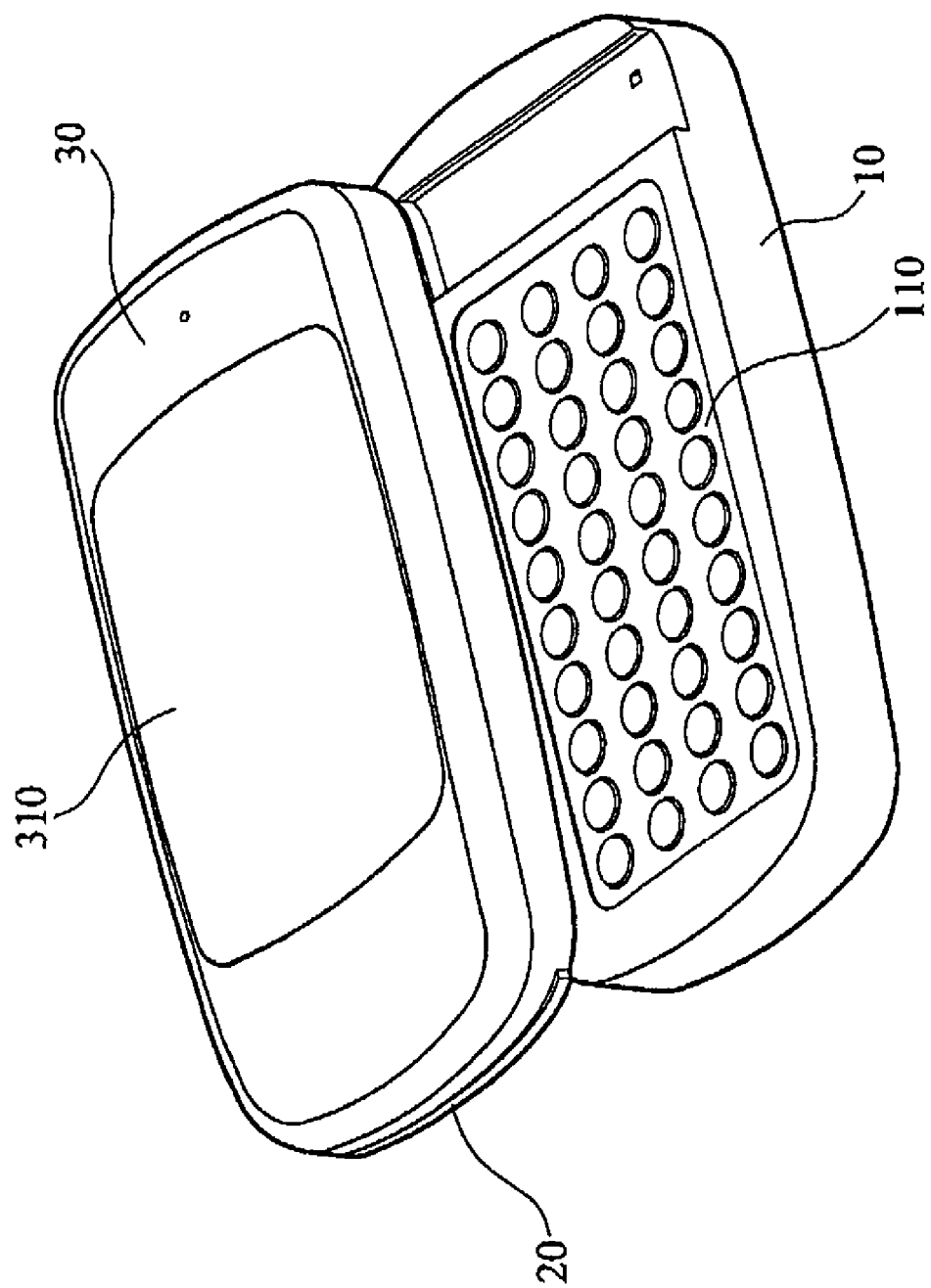
FIG. 2B is another schematic view of the two-dimensional slide assembly in FIG. 2A.
Figure 2C:
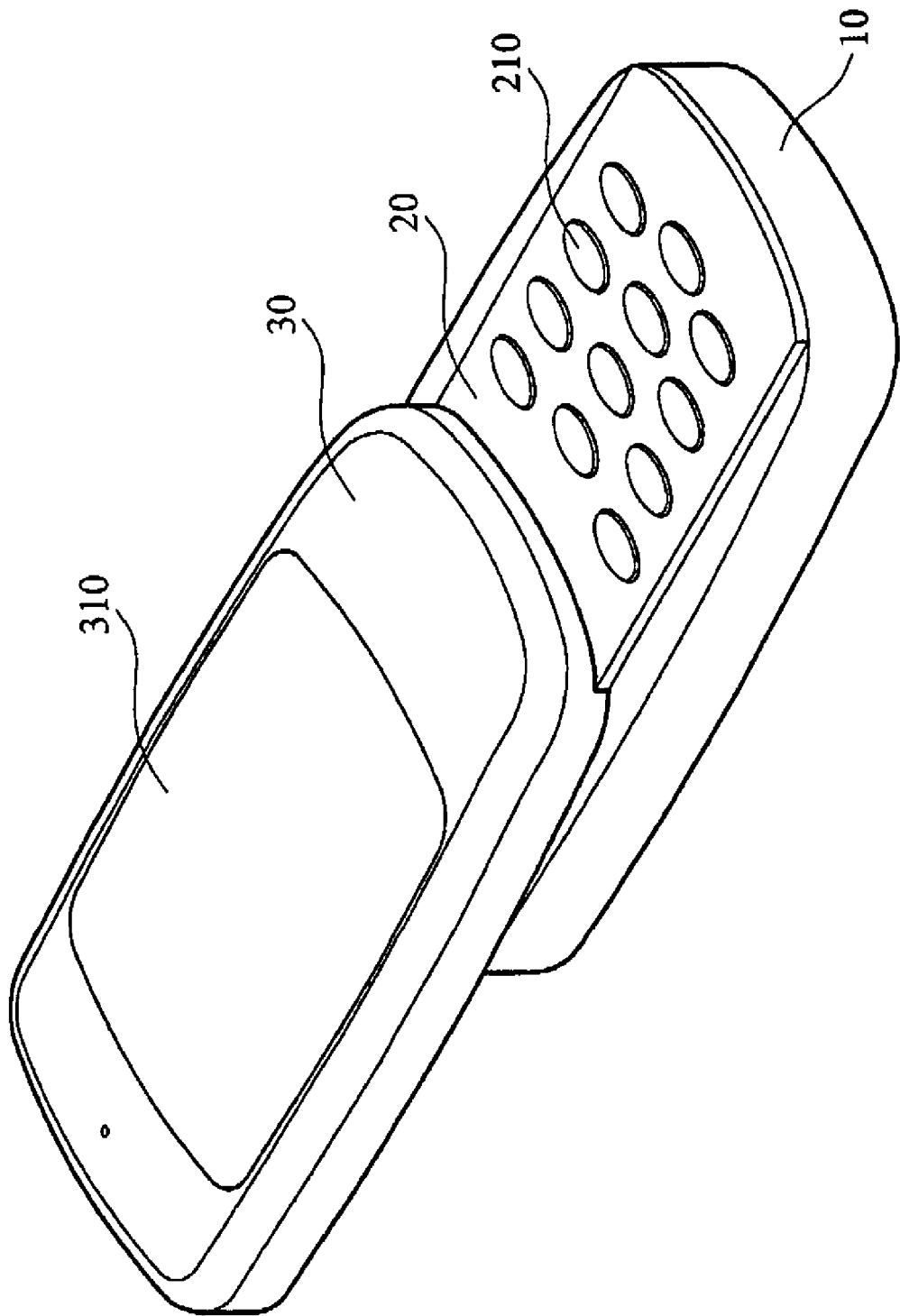
FIG. 2C is a further schematic view of the two-dimensional slide assembly in FIG. 2A.

An embodiment of a two-dimensional slide assembly is hereinafter described with respect to FIG. 2A, FIG. 2B, FIG. 2C and FIG. 2D. The two-dimensional slide assembly can be employed by a two-dimensional sliding cover electronic device, such as a multi-functional electronic device with cellular phone and PDA functions. The two-dimensional slide assembly comprises a first member 10, a second member 20, a third member 30, and a first torque-retaining assembly 50. The first member 10 can be a body of the electronic device. In FIG. 2A, the first member 10, the second member 20 and the third member 30 are stacked together. In FIG. 2B, the second member 20 is movable along the X-direction (a first direction) in relation to the first member 10. In FIG. 2C, the third member 30 is movable along the Y-direction (a second direction) in relation to the second member 20. The X-direction and the Y-direction are perpendicular to each other.

Figure 2D:
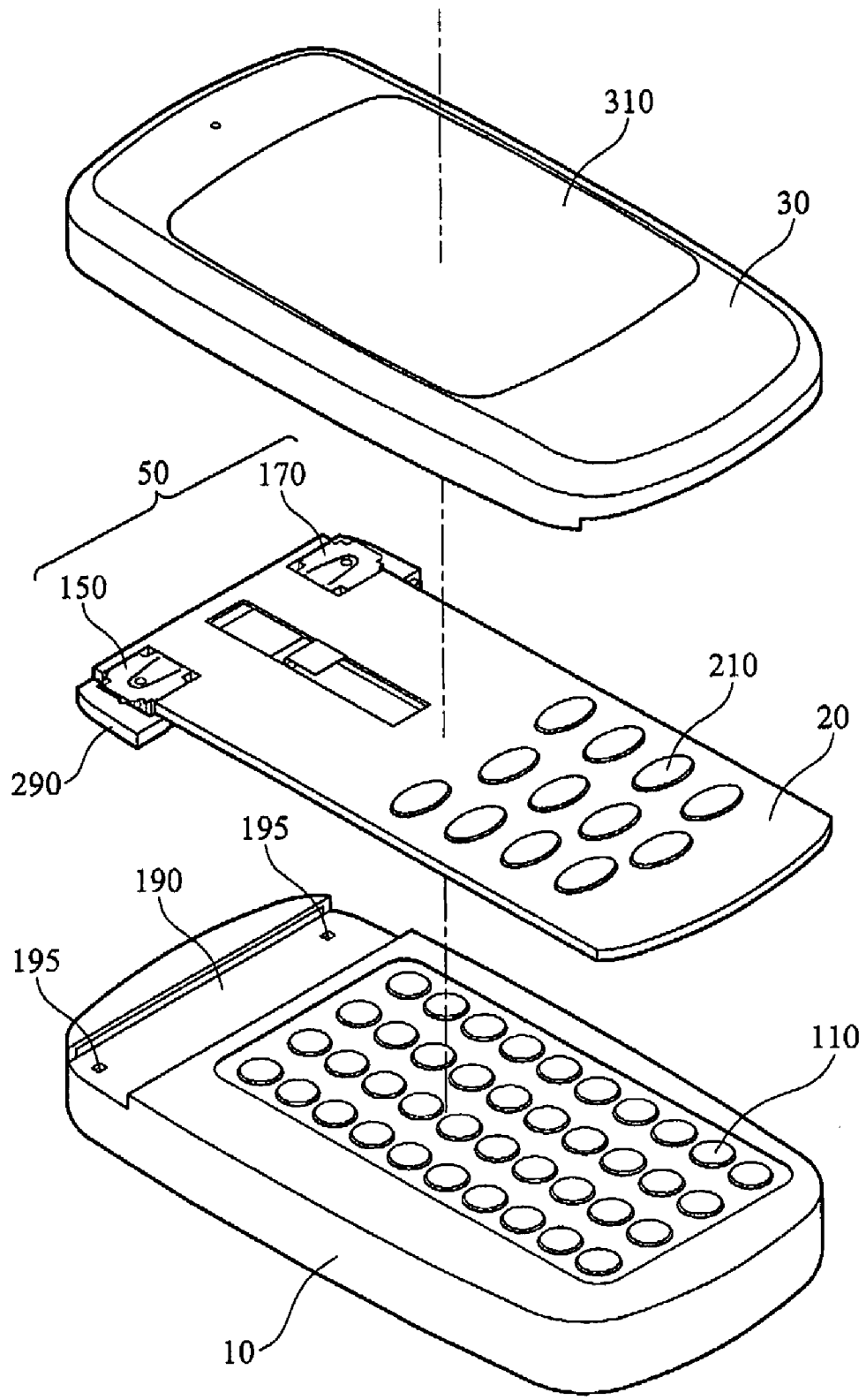
FIG. 2D is a disassembled view of an embodiment of a two-dimensional slide assembly.

FIG. 2D shows a disassembled view of the two-dimensional slide assembly. The first member 10 comprises a first input module 110, such as a keyboard, and a notch 190, which comprises several indentations 195. The second member 20 comprises a second input module 210, such as a keyboard, and a block 290, which comprises a protrusion (not shown) corresponding to the indentations 195. The third member 30 comprises an output module 310, such as a display screen. The first torque-retaining assembly 50 is disposed between the second member 20 and the third member 30.

The first member 10 and the second member 20 move relative to one another via the sliding motion of the block 290 and the notch 190, and can be positioned by engaging the protrusion with one of the indentations 195. The second member 20 and the third member 30 move relative to one another via the action of the first torque-retaining assembly 50 such that the third member 30 is movable between a first position and a second position along the Y-direction (the second direction) in relation to the second member 20, with a first central position therebetween. The first position and the second position can alternatively be an open position and a closed position. For example, when the third member 30 in FIG. 3A is in the first position (the closed position), the third member 30 in FIG. 3B is in the first central position, and the third member 30 in FIG. 3C is in the second position (the open position).

Figure 3A:
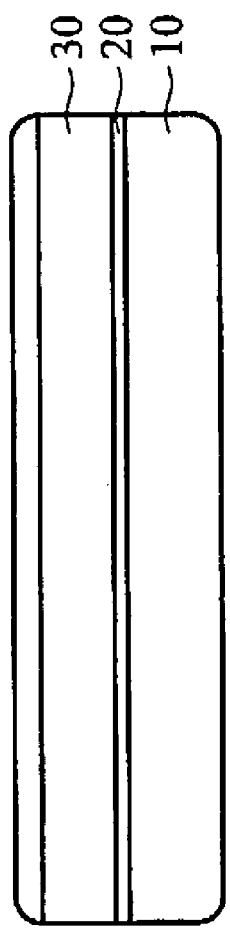
FIG. 3A is a schematic view of an embodiment of a two-dimensional slide assembly with the third member in the first position.
Figure 3B:
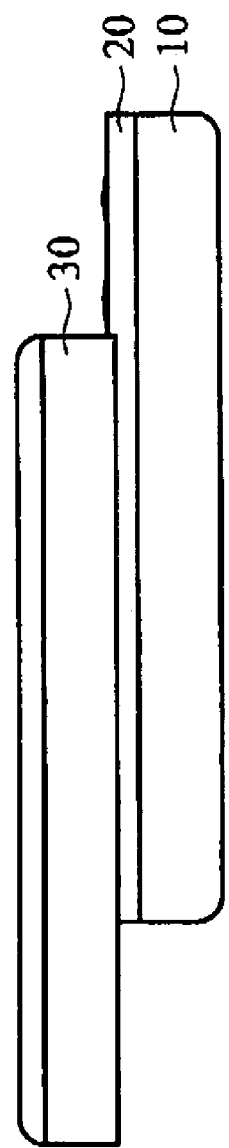
FIG. 3B is a schematic view of the two-dimensional slide assembly in FIG. 3A with the third member in the first central position.

When the third member 30 moves from the first position (as shown in FIG. 3A) to the first central position (as shown in FIG. 3B) in relation to the second member 20 by a first external force, the first torque-retaining assembly 50 generates a first torque, and the first torque drives the third member 30 from the first central position to the first position. Further, when the third member 30 moves from the second position (as shown in FIG. 3C) to the first central position (as shown in FIG. 3B) in relation to the second member 20 by a second external force, the first torque-retaining assembly 50 generates a second torque, and the second torque drives the third member 30 the first central position to the second position.

Figure 3C:
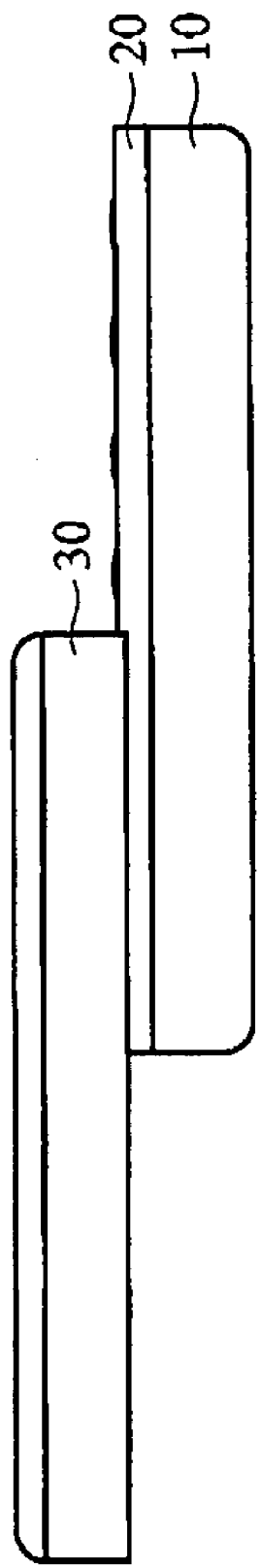
FIG. 3C is a schematic view of the two-dimensional slide assembly in FIG. 3A with the third member in the second position.

In this case, the third member 30 is to be moved from the first position as shown in FIG. 3A to the second position as shown in FIG. 3C, the third member 30 is moved from the first position to the first central position as shown in FIG. 3B, and the second torque generated by the first torque-retaining assembly 50 drives the third member 30 from the first central position to the second position. Similarly, the third member 30 is to be moved from the second position as shown in FIG. 3C to the first position as shown in FIG. 3A, the third member 30 is moved from the second position to the first central position as shown in FIG. 3B, and the first torque generated by the first torque-retaining assembly 50 drives the third member 30 from the first central position to the first position. The substantial structure of the fist torque-retaining assembly 50 is described later.

The first torque-retaining assembly 50 may comprise a first slide module 150, a second slide module 170, a first sliding track 130 and a second sliding track 140. The first slide module 150 and the second slide module 170 are symmetrically disposed on the second member 20. Detailed description of the first slide module 150 will be hereinafter described, and the description of the second slide module 170, which is symmetrical to the first slide module 150, is thus omitted.

Figure 4A:
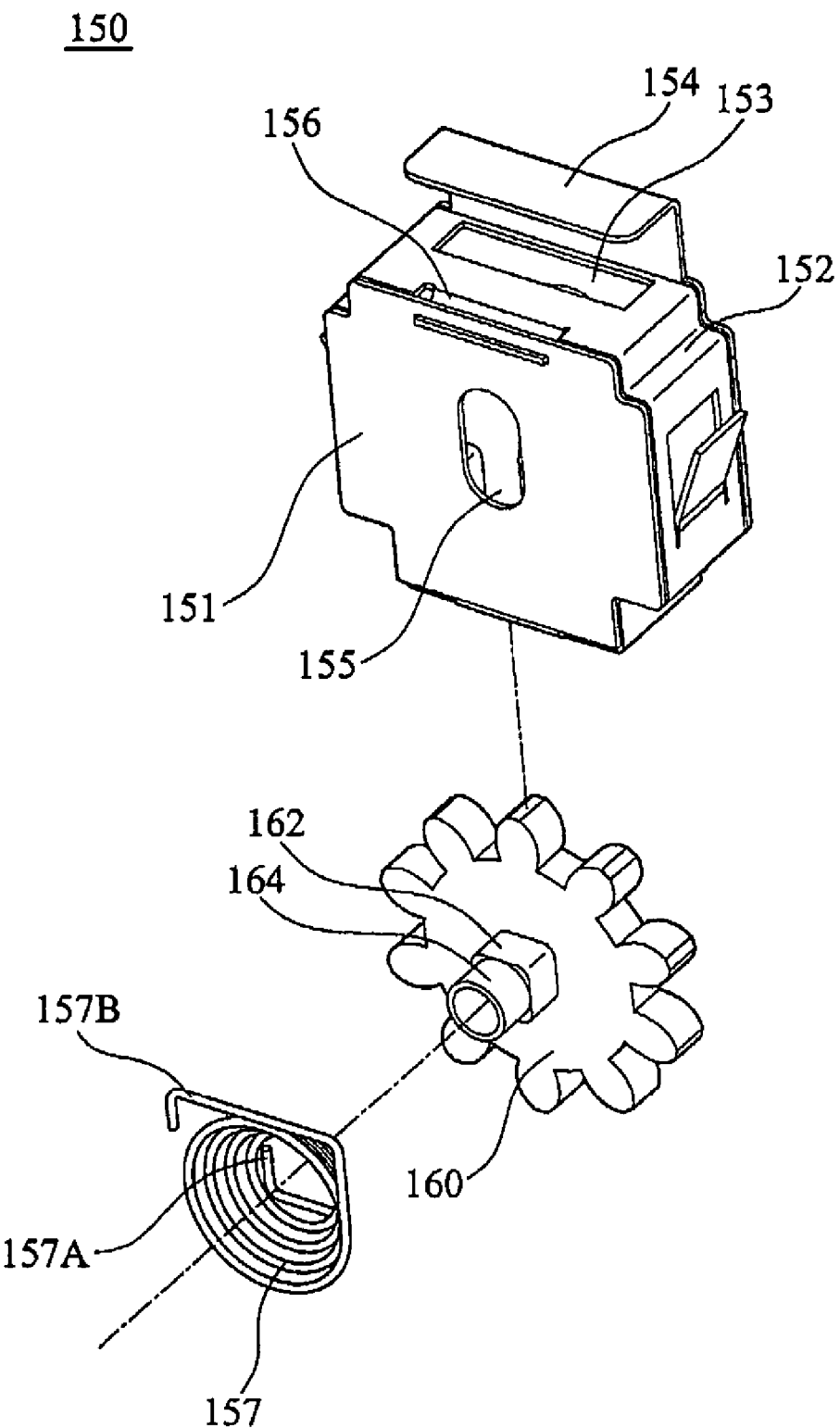
FIG. 4A is a perspective disassembled view of the first slide module.
Figure 4B:
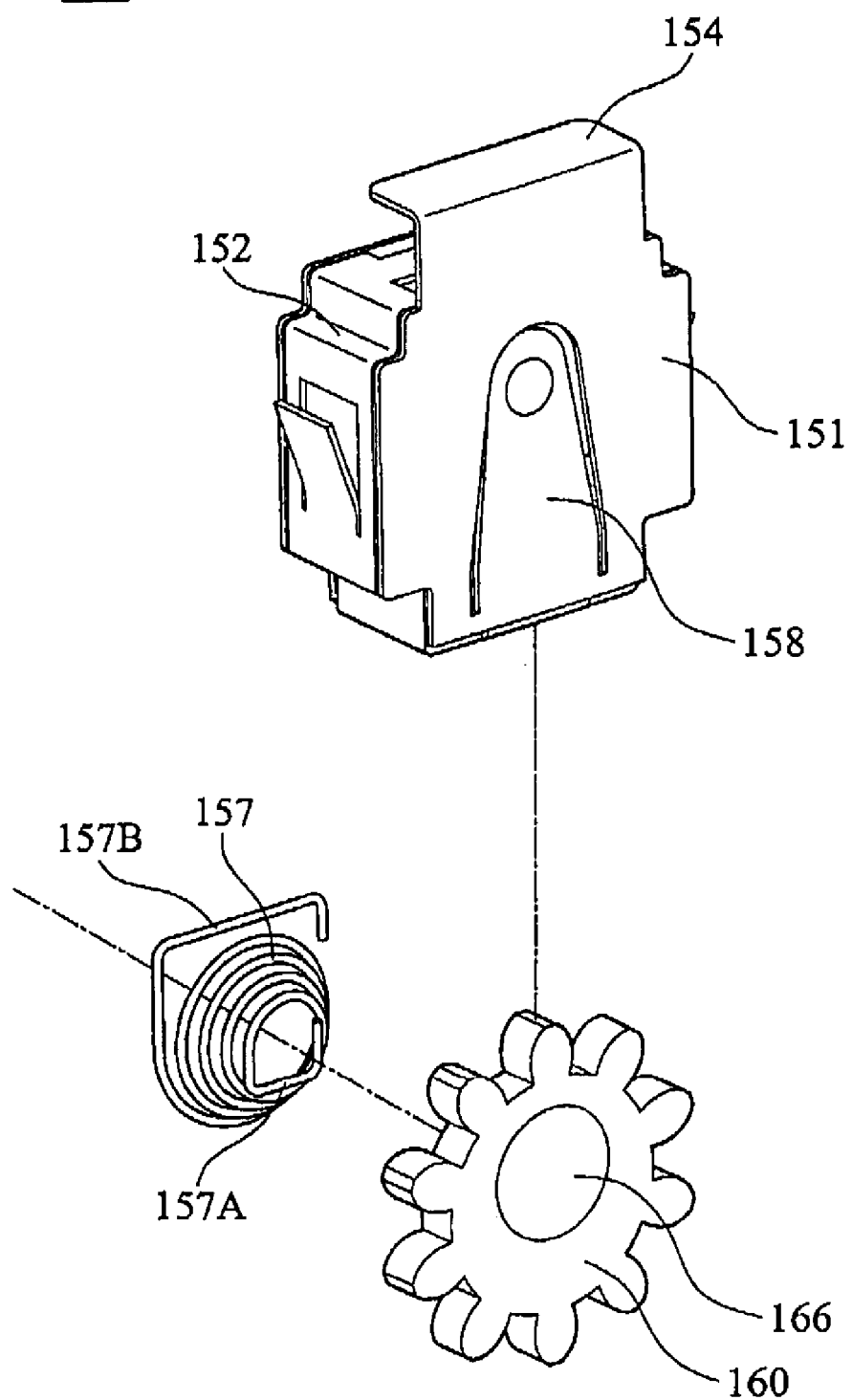
FIG. 4B is another perspective disassembled view of the first slide module.

FIG. 4A and FIG. 4B show the elements of the first slide module 150. The first slide module 150 comprises a first supporting structure 151, a first gear 160, and a first elastic element 157.

The first supporting structure 151 is disposed on the second member 20 to support the first gear 160. The first supporting structure 151 comprises a first limiting portion 152, a first sliding notch 154 and a first guide groove 155. The first guide groove 155 is disposed on a side of the first supporting structure 151 to guide the first gear 160 to rotate and move. Further, the upper portion of the first supporting structure 51 comprises a first opening 153, exposing a part of the first gear 160, and a first engaging notch 156 for fixing the first elastic element 157. On the other side of the first supporting structure 151 opposite to the first guide groove 155, a first elastic sheet 158 is disposed to position the first gear 160.

The first gear 160 is rotatably disposed in the first guide groove 155 by a first rotating shaft 164. The first rotating shaft 164 protrudes from one side of the first gear 160 and connects to a first fixing shaft 162 to fix the first elastic element 157. On the other side of the first gear 160, a first abutting notch 166 is provided to abut the first spring sheet 158 so that the first gear 160 can rotate stably in the first supporting structure 151. Thus, the first gear 160 can move between a first limited position and a first free position along the first guide groove 155.

The first elastic element 157 can be a torsion spring, and comprises a first end 157A and a second end 157B. The first end 157A is fixed to the first fixing shaft 162 of the first gear 160, and the second end 157B is fixed to the first engaging notch 156 of the first supporting structure 151. The first fixing shaft 162 has a non-circular cross section, so the first elastic element 157 is fixed between the first gear 160 and the first supporting structure 151 without rotation. Thus, the first gear 160 forms a first rotating structure rotatable in relation to the first supporting structure 151 to generate a first torque.

Figure 4C:
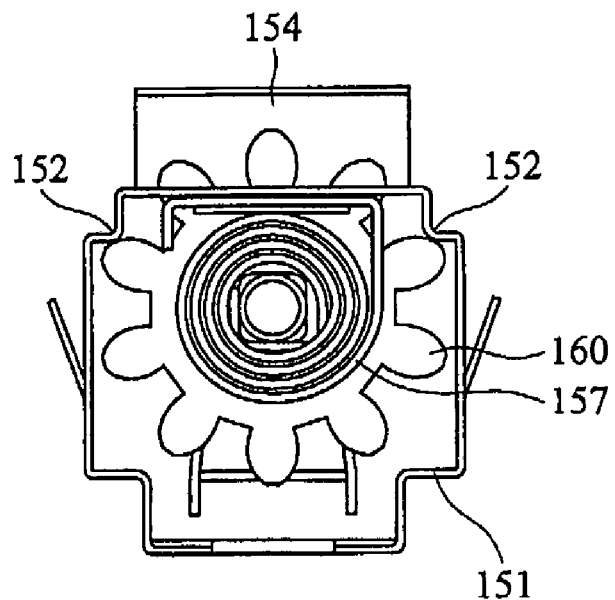
FIG. 4C is a schematic view of the first slide module with the first gear in the first limited position.
Figure 4D:
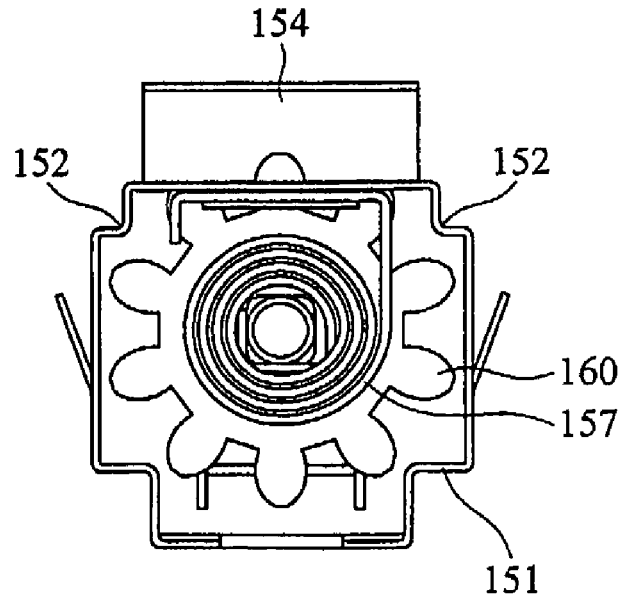
FIG. 4D is a schematic view of the first slide module with the first gear in the first free position.

Referring to FIG. 4C, when the first gear 160 is in the first limited position, the first gear 160 is limited by the first limiting portion 152, and is not rotatable in relation to the first supporting structure 151. Referring to FIG. 4D, when the first gear 160 is in the first free position, the first gear 160 is released from the first limiting portion 152, and is rotatable in relation to the first supporting structure 151. Thus, the original position of the first gear 160 is set in the first limiting position to prevent the first gear 160 from rotating.

Figure 5:
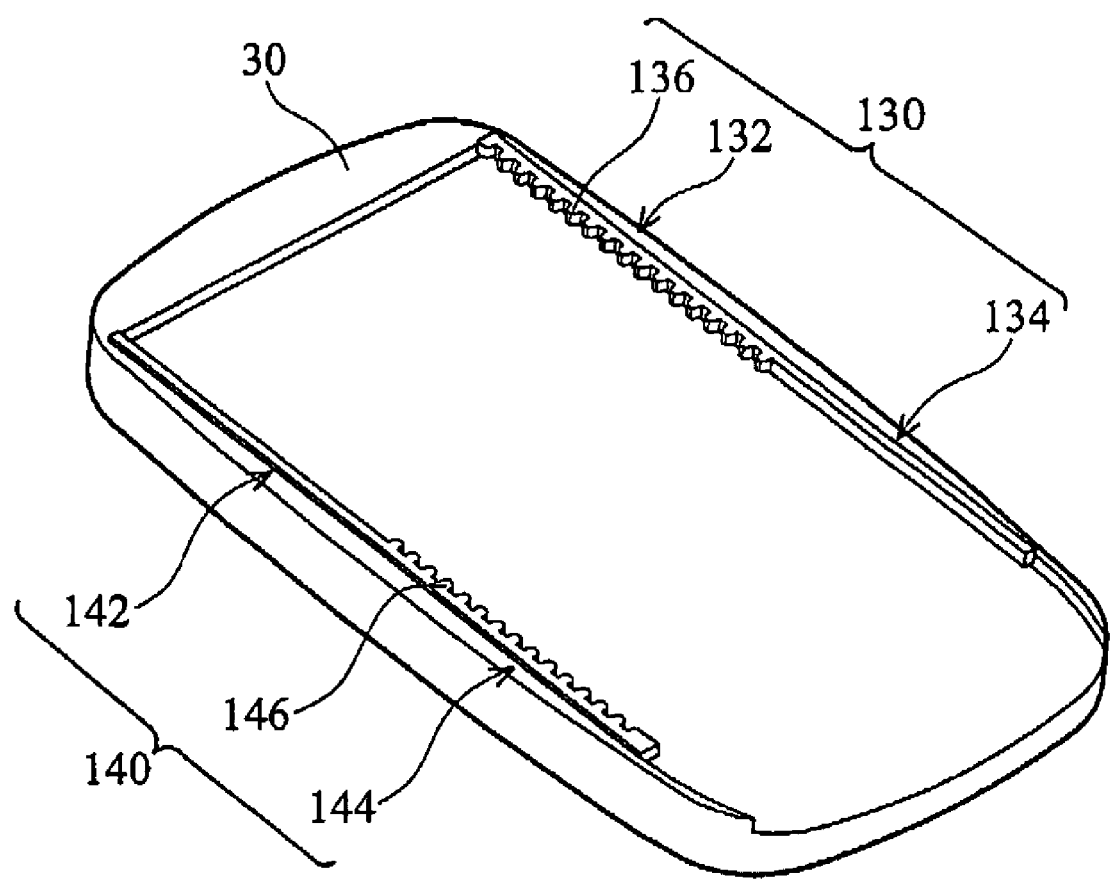
FIG. 5 is a schematic view of assembly of the third member, the first sliding track and the second sliding track.

FIG. 5 shows assembly of the third member 30, the first sliding track 130 and the second sliding track 140. The first sliding track 130 and the second sliding track 140 are parallelly disposed on a surface of the third member 30 facing the second member 20, and correspond to the first sliding notch 154 and the second sliding notch 174. The first sliding track 130 comprises a first track section 132 and a second track section 134, and the second sliding track 140 comprising a third track section 142 and a fourth track section 144. The first track section 132 comprises a first rack 136, and the fourth track section 144 comprises a second rack 146.

The action of the first torque-retaining assembly 50 is described hereinafter in detail with respect to FIG. 6A, FIG. 6B and FIG. 6C. Since the first sliding track 130 and the second sliding track 140 are attached to the third member 30, FIG. 6A, FIG. 6B and FIG. 6C only show the first sliding track 130 and the second sliding track 140. The third member 30 and detailed illustration of the first slide module 150 and the second slide module 170 are omitted to simplify the figures.

Figure 6A:
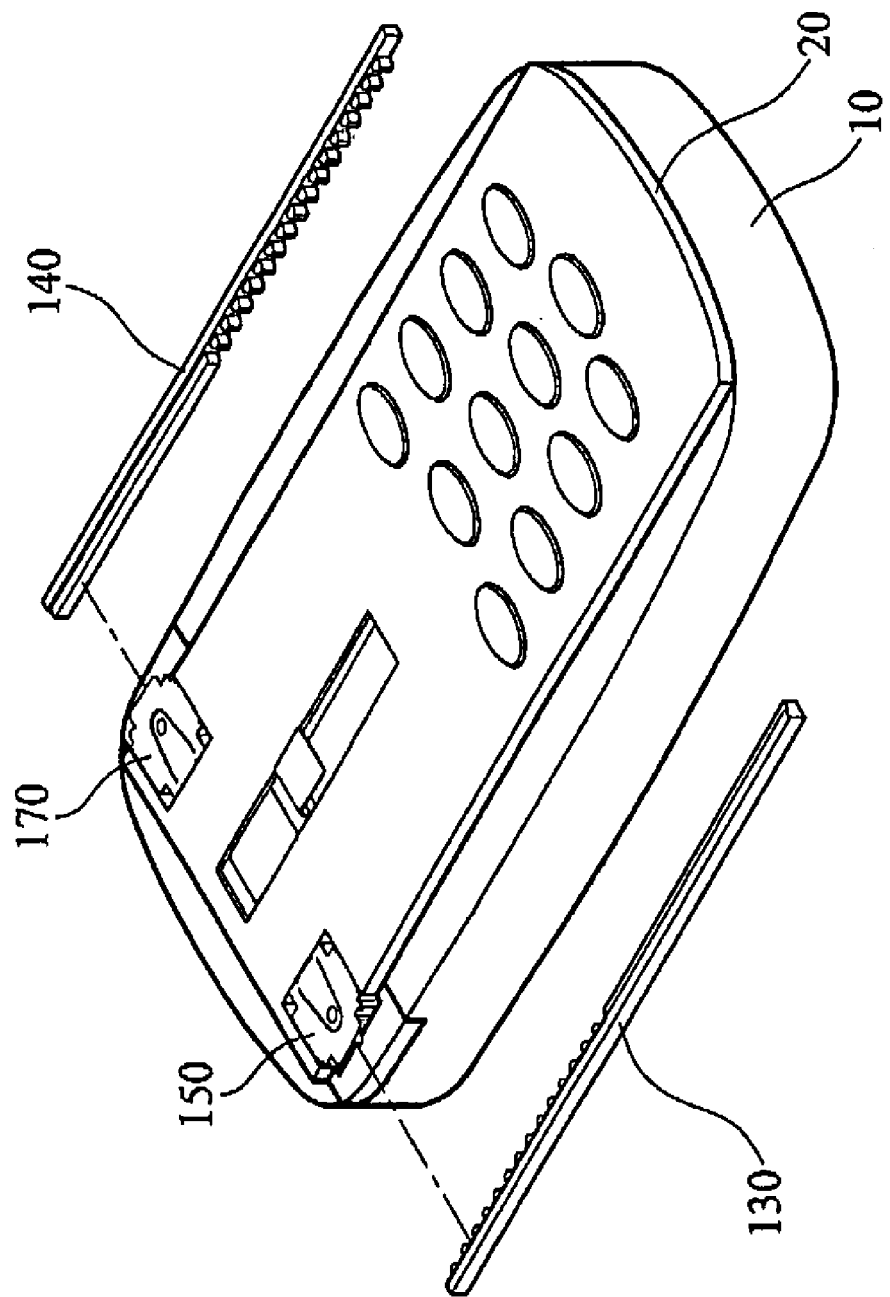
FIG. 6A is a schematic view of the second member, the first sliding track and the second sliding track when the third member is in the first position.

In FIG. 6A, when the third member 30 is in the first position (referring to FIG. 3A) in relation to the second member 20, the first gear 160 corresponds to the first track section 132 of the first sliding track 130, and the second gear of the second slide module 170 corresponds to the third track section 142 of the second sliding track 140.

Figure 6B:
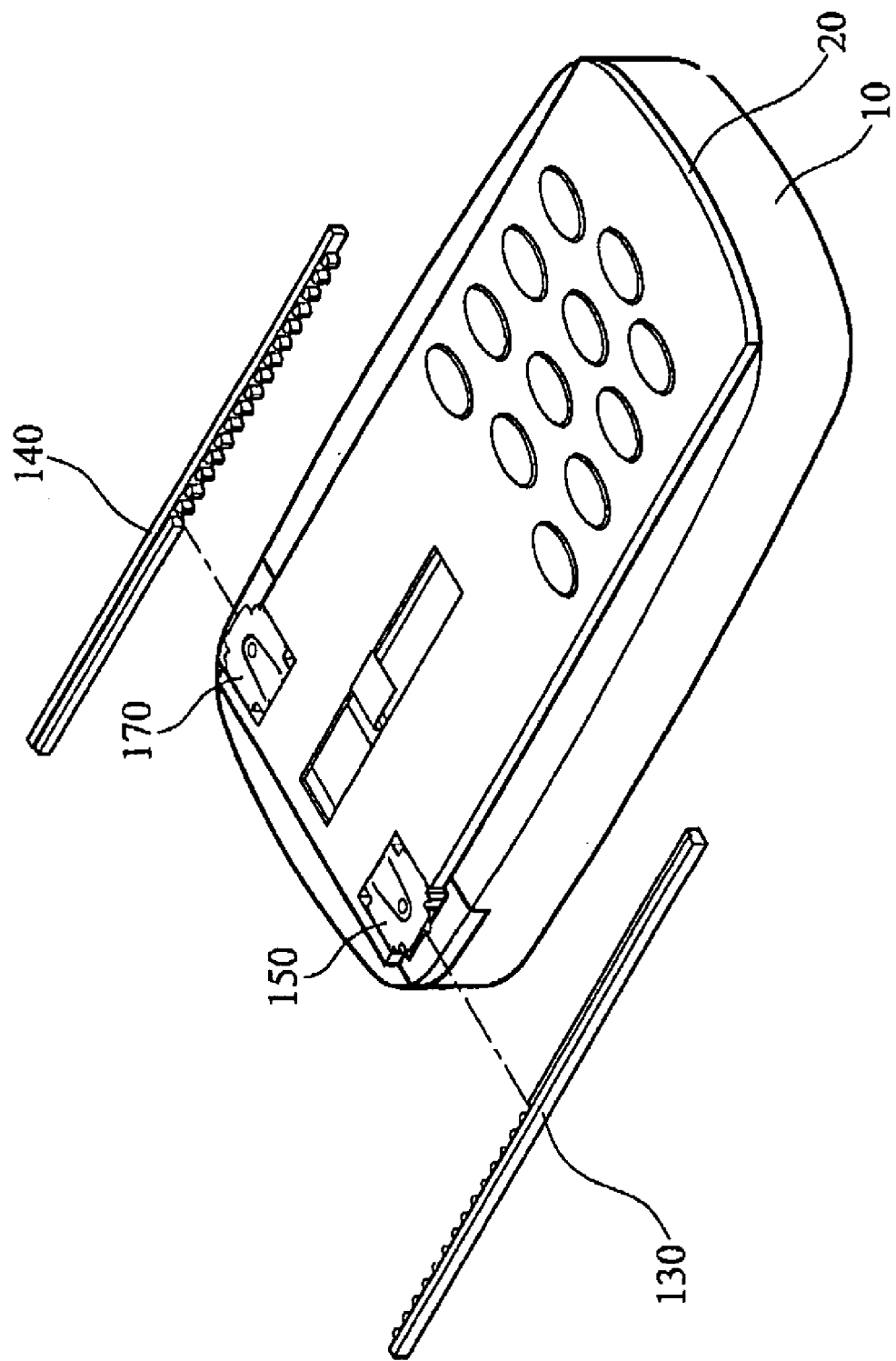
FIG. 6B is a schematic view of the second member, the first sliding track and the second sliding track when the third member is in the first central position.

In FIG. 6B, when the third member 30 moves to the first central position (referring to FIG. 3B) in relation to the second member 20, the first gear 160 corresponds to the middle portion of the first track section 132 and the second track section 134 of the first sliding track 130, and the second gear of the second slide module 170 corresponds to the middle portion of the third track section 142 and the fourth track section 144 of the second sliding track 140.

Figure 6C:
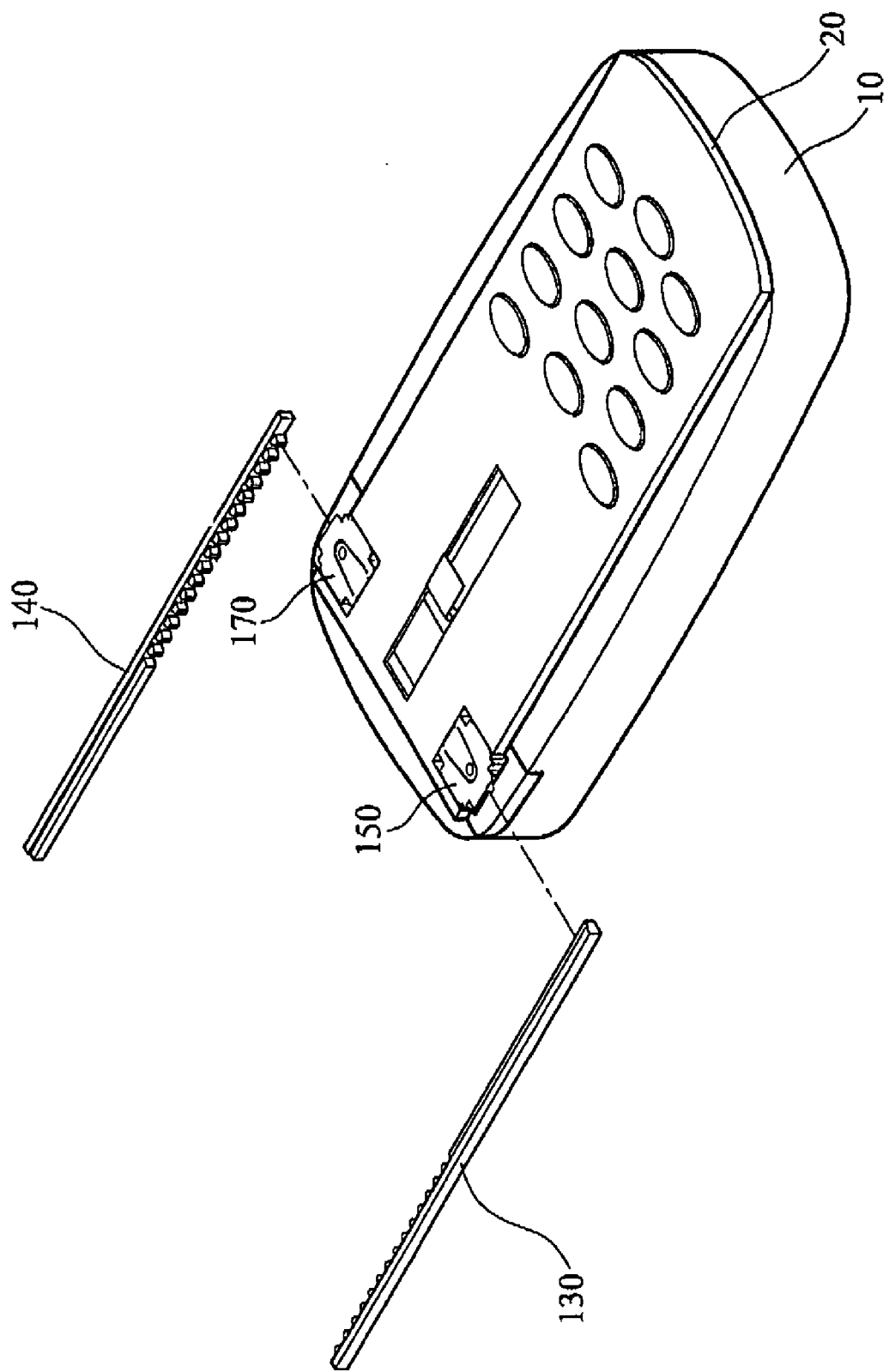
FIG. 6C is a schematic view of the second member, the first sliding track and the second sliding track when the third member is in the second position.

Further, in FIG. 6C, when the third member 30 is disposed in the second position (referring to FIG. 3C) in relation to the second member 20, the first gear 160 corresponds to the second track section 134 of the first sliding track 130, and the second gear of the second slide module 170 corresponds to the fourth track section 144 of the second sliding track 140.

Accordingly, when the third member 30 is between the first position (as shown in FIG. 6A) and the first central position (as shown in FIG. 6B) in relation to the second member 20, the first gear 160 corresponds to the first track section 132, and the second gear corresponds to the third track section 142. Since the first track section 132 comprises the first rack 136 and the third track section 142 comprises no rack, the first gear 160 engages with the first rack 146, moving the first gear 160 to the first free position, and the second gear is in the second limited position. Thus, the first gear 160 (i.e. the first rotating structure) is rotatable, and the second gear (i.e. the second rotating structure) is not.

Further, when the third member 30 is between the first central position (as shown in FIG. 6B) and the second position (as shown in FIG. 6C) in relation to the second member 20, the first gear 160 corresponds to the second track section 134, and the second gear corresponds to the fourth track section 144. Since the fourth track section 144 comprises the second rack 146 and the second track section 134 comprises no rack, the second gear engages the second rack 146, moving the second gear to the second free position, and the first gear 160 is in the first limited position. Thus, the first gear 160 (i.e. the first rotating structure) is not rotatable, and the second gear (i.e. the second rotating structure) is rotatable.

In other words, when the third member 30 is to be moved from the first position as shown in FIG. 6A to the second position as shown in FIG. 6C, the third member 30 is moved from the first position to the first central position as shown in FIG. 6B. Since the first gear 160 (i.e. the first rotating structure) is rotatable and the second gear (i.e. the second rotating structure) is not rotatable when the third member 30 is between the first position and the first central position, the first elastic element 157 connected to the first gear 160 generates a first torque. When the third member 30 passes the first central position, the first gear 160 (i.e. the first rotating structure) is not rotatable, and the second gear (i.e. the second rotating structure) is rotatable. Thus, the first torque is stored, and a second torque generated and stored in the second elastic element is released, driving the second gear to rotate and moves the third member 30 from the first central position to the second position. Thus, no external force is required.

Similarly, when the third member 30 is to be moved from the second position as shown in FIG. 6C to the first position as shown in FIG. 6A, the third member 30 is moved from the second position to the first central position as shown in FIG. 6B. Since the first gear 160 (i.e. the first rotating structure) is not rotatable and the second gear (i.e. the second rotating structure) is rotatable when the third member 30 is between the first central position and the second position, the second elastic element connected to the second gear generates the second torque. When the third member 30 passes the first central position, the first gear 160 (i.e. the first rotating structure) is rotatable, and the second gear (i.e. the second rotating structure) is not rotatable. Thus, the second torque is stored, and the first torque generated and stored in the first elastic element 157 is released, driving the first gear 160 to rotate and moves the third member 30 from the first central position to the first position. Thus, no external force is required.

It should be noted that the first elastic element 157 and the second elastic element sustain torsion in opposite directions such that the first torque and the second torque drive the third member 30 in opposite directions. However, the elastic elements are not limited to the torsion springs disclosed here.

Further, while the first sliding track 130 and the second sliding track 140 in FIG. 5 are individual and separate structures, they can be integrally formed as a rack board.

Further, in the embodiments disclosed, a second torque-retaining assembly similar to the first torque-retaining assembly 50 can be provided between the first member 10 and the second member 20. In this case, the second member 20 is movable between a third position and a fourth position along the X-direction (the first direction) in relation to the first member 10, with a second central position therebetween. When the second member 20 moves from the third position to the second central position in relation to the first member 10 by a third external force, the second torque-retaining assembly generates a third torque, and the third torque drives the second member 20 from the second central position to the third position. When the second member 20 moves from the fourth position to the second central position in relation to the first member 10 by a fourth external force, the second torque-retaining assembly generates a fourth torque, and the fourth torque drives the second member 20 from the second central position to the fourth position.

Further, in the embodiments disclosed, the first position is a closed position, and the second position is an open position. However, the first and second positions can be any positions, not be limited to the embodiments and the figures.

Further, in the embodiments disclosed, the first slide module 150 and the second slide module 170 are symmetrical structures. However, the first slide module 150 and the second slide module 170 can have different structures.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A two-dimensional slide apparatus, for a portable communication device comprising:
    a first member;
    a second member movable along a first direction in relation to the first member;
    a third member movable between a first position and a second position along a second direction in relation to the second member, with a first central position therebetween; and
    a first torque-retaining assembly disposed between the second member and the third member;
    wherein, when the third member moves from the first position to the first central position in relation to the second member by a first external force, the first torque-retaining assembly generates a first torque, and the first torque drives the third member from the first central position to the first position; and
    when the third member moves from the second position to the first central position in relation to the second member by a second external force, the first torque-retaining assembly generates a second torque, and the second torque drives the third member from the first central position to the second position.

2. The two-dimensional slide apparatus as claimed in claim 1, wherein the first direction is perpendicular to the second direction.

3. The two-dimensional slide apparatus as claimed in claim 1, wherein the first member is a body.

4. The two-dimensional slide apparatus as claimed in claim 1, wherein the first member comprises a first input device, the second member comprises a second input device, and the third member comprises an output device.

5. The two-dimensional slide apparatus as claimed in claim 1, wherein the second member is movable between a third position and a fourth position along the first direction in relation to the first member, with a second central position therebetween.

6. The two-dimensional slide apparatus as claimed in claim 5, further comprising a second torque-retaining assembly disposed between the first member and the second member, wherein:
    when the second member moves from the third position to the second central position in relation to the first member by a third external force, the second torque-retaining assembly generates a third torque, and the third torque tends to drive the second member to move from the second central position to the third position; and
    when the second member moves from the fourth position to the second central position in relation to the first member by a fourth external force, the second torque-retaining assembly generates a fourth torque, and the fourth torque drives the second member from the second central position to the fourth position.

7. The two-dimensional slide apparatus as claimed in claim 1, wherein the first torque-retaining assembly comprises:
a first slide module disposed on the second member, comprising:
a first rotating structure rotatable when the third member is between the first position and the first central position and not rotatable when the third member is between the first central position and the second position; and
a first elastic element comprising a first end fixed to the first rotating structure and a second end fixed to the second member; and
a second slide module disposed on the second member, comprising:
a second rotating structure not rotatable when the third member is between the first position and the first central position and rotatable when the third member is between the first central position and the second position; and
a second elastic element comprising a third end fixed to the second rotating structure and a fourth end fixed to the second member;
wherein, when the third member moves from the first position to the first central position in relation to the second member by the first external force, the first rotating structure rotates to generate the first torque in the first elastic element, and the first torque drives the third member from the first central position to the first position;
when the third member moves from the second position to the first central position in relation to the second member by the second external force, the second rotating structure rotates to generate the second torque in the second elastic element, and the second torque drives the third member from the first central position to the second position.

8. The two-dimensional slide apparatus as claimed in claim 7, wherein the first rotating structure is a first gear, and the second rotating structure is a second gear.

9. The two-dimensional slide apparatus as claimed in claim 7, wherein the first elastic element and the second elastic element are torsion springs.

10. The two-dimensional slide apparatus as claimed in claim 7, wherein the first elastic element and the second elastic element sustain torsion in opposite directions.

11. The two-dimensional slide apparatus as claimed in claim 1, wherein the first torque-retaining assembly comprises:
a first slide module disposed on the second member, comprising:
a first supporting structure comprising a first sliding notch, a first limiting portion and a first guide groove;
a first gear disposed in the first supporting structure and movable between a first limited position and a first free position along the first guide groove, wherein the first gear is not rotatable when limited by the first limiting portion and in the first limited position and rotatable when the first gear is in the first free position; and
a first elastic element comprising a first and fixed to the first gear and a second end fixed to the first supporting structure;
a first sliding track disposed on the third member, corresponding to the first sliding notch, comprising a first track section and a second track section, the first track section comprising a first rack;
a second slide module disposed on the second member, comprising:
a second supporting structure comprising a second sliding notch, a second limiting portion and a second guide groove;
a second gear disposed in the second supporting structure and movable between a second limited position and a second free position along the second guide groove, wherein the second gear is not rotatable when limited by the second limiting portion and in the second limited position and rotatable when the second gear is in the second free position; and
a second elastic element comprising a third end fixed to the second gear and a fourth end fixed to the second supporting structure;
a second sliding track disposed on the third member, corresponding to the second sliding notch, comprising a third track section and a fourth track section, the fourth track section comprising a second rack;
wherein, when the third member is between the first position and the first central position in relation to the second member, the first gear corresponds to the first track section and engages with the first rack, moving the first gear to the first free position, and the second gear corresponds to the third track section and is in the second limited position;
when the third member is between the first central position and the second position in relation to the second member, the first gear corresponds to the second track section and is in the first limited position, and the second gear corresponds to the fourth track section and engages with the second rack, moving the second gear to the second free position.

12. The two-dimensional slide apparatus as claimed in claim 11. wherein the first elastic element and the second elastic element are torsion springs.

13. The two-dimensional slide apparatus as claimed in claim 11, wherein the first elastic element and the second elastic element sustain torsion in opposite directions.

14. The two-dimensional slide apparatus as claimed in claim 1, wherein the first member comprises a notch substantially extended along the first direction, the second member comprises a block corresponding to the notch, and the second member is movable in relation to the first member along the first direction by the block and the notch.

15. The two-dimensional slide apparatus as claimed in claim 14, wherein the block comprises a protrusion and the notch comprises an indentation corresponding to the protrusion, and the first member and the second member are positioned when the protrusion engages the indentation.

* * * * *